United States Patent
Machida et al.

(10) Patent No.: US 10,927,527 B2
(45) Date of Patent: Feb. 23, 2021

(54) PERIPHERY MONITORING DEVICE FOR CRAWLER-TYPE WORKING MACHINE

(71) Applicant: Komatsu Ltd., Tokyo (JP)

(72) Inventors: Masaomi Machida, Hiratsuka (JP); Takeshi Kurihara, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 160 days.

(21) Appl. No.: 15/125,358

(22) PCT Filed: Sep. 30, 2015

(86) PCT No.: PCT/JP2015/077871
§ 371 (c)(1),
(2) Date: Sep. 12, 2016

(87) PCT Pub. No.: WO2016/047806
PCT Pub. Date: Mar. 31, 2016

(65) Prior Publication Data
US 2017/0089042 A1    Mar. 30, 2017

(51) Int. Cl.
*H04N 7/00* (2011.01)
*E02F 9/26* (2006.01)
(Continued)

(52) U.S. Cl.
CPC ............... *E02F 9/261* (2013.01); *B60R 1/00* (2013.01); *G06K 9/00805* (2013.01); *H04N 5/272* (2013.01); *H04N 7/181* (2013.01); *H04N 7/183* (2013.01); *B60R 2300/303* (2013.01); *B60R 2300/306* (2013.01); *B60R 2300/607* (2013.01); *B60R 2300/80* (2013.01); *E02F 3/32* (2013.01); *E02F 3/964* (2013.01)

(58) Field of Classification Search
CPC ... H04N 7/00; H04N 5/00; B60R 1/00; B60R 11/00; G06T 11/60
See application file for complete search history.

(56) References Cited

U.S. PATENT DOCUMENTS

2013/0182066 A1  7/2013  Ishimoto
2013/0222573 A1  8/2013  Onuma et al.
(Continued)

FOREIGN PATENT DOCUMENTS

CN  103563358  2/2014
CN  103797789  5/2014
(Continued)

OTHER PUBLICATIONS

Office Action in Japanese Application No. 2016-184508, dated Jun. 27, 2017, 7 pages, with English translation.
(Continued)

*Primary Examiner* — Maryam A Nasri
(74) *Attorney, Agent, or Firm* — Fish & Richardson P.C.

(57) ABSTRACT

A surroundings monitoring device of a crawler-type work machine includes: cameras configured to take images of surroundings of the crawler-type work machine; a display unit configured to display the images taken by the cameras; and a controller configured to superimpose an outer-edge guide image generated based on the farthest position of an undercarriage from a revolution center of the crawler-type work machine on the display unit.

13 Claims, 15 Drawing Sheets

(51) Int. Cl.
*B60R 1/00* (2006.01)
*H04N 7/18* (2006.01)
*G06K 9/00* (2006.01)
*H04N 5/272* (2006.01)
*E02F 3/32* (2006.01)
*E02F 3/96* (2006.01)

(56) References Cited

U.S. PATENT DOCUMENTS

| | | | |
|---|---|---|---|
| 2014/0111648 A1 | 4/2014 | Ishimoto | |
| 2014/0267731 A1 | 9/2014 | Izumikawa | |
| 2014/0293051 A1 | 10/2014 | Nakamura et al. | |
| 2014/0354813 A1* | 12/2014 | Ishimoto | H04N 7/181 |
| | | | 348/148 |
| 2015/0217690 A1 | 8/2015 | Mitsuta et al. | |
| 2016/0205319 A1 | 7/2016 | Oota et al. | |

FOREIGN PATENT DOCUMENTS

| | | |
|---|---|---|
| CN | 103828353 | 5/2014 |
| EP | 2955914 | 12/2015 |
| JP | H06-128987 | 5/1994 |
| JP | 2005-188160 | 7/2005 |
| JP | 2008-002113 | 1/2008 |
| JP | 2008-095307 | 4/2008 |
| JP | 2011-012522 | 1/2011 |
| JP | 2011-084294 | 4/2011 |
| JP | 2012-046074 | 3/2012 |
| JP | 2012-074929 | 4/2012 |
| JP | 2012-107395 | 6/2012 |
| JP | 2013-253402 | 12/2013 |
| KR | 10-2014-0035440 | 3/2014 |
| KR | 10-2014-0060321 | 5/2014 |
| KR | 10-2016-0033144 | 3/2016 |
| WO | WO 2012/137723 | 10/2012 |
| WO | WO 2012/157438 | 11/2012 |
| WO | WO 2013/088995 | 6/2013 |
| WO | WO 2014/123228 | 8/2014 |

OTHER PUBLICATIONS

Notice of Allowance in Korean Application No. 2016-7024443, dated Jan. 8, 2018, 3 pages (with English translation).
International Preliminary Report on Patentability in International Application No. PCT/JP2015/077871, dated Apr. 3, 2018, 7 pages, with English translation.
International Search Report in International Application No. PCT/JP2015/077871, dated Dec. 22, 2015, 11 pages, with English translation.
German Office Action in German Application No. 112015001236.2, dated Aug. 23, 2018, 9 pages with English Translation.
Chinese Office Action in Chinese Application No. 201580013150.9, dated Jan. 7, 2019, 11 pages (with English Translation).

* cited by examiner

PERIPHERY MONITORING DEVICE FOR CRAWLER-TYPE WORKING MACHINE

CROSS-REFERENCE TO RELATED APPLICATIONS

This application claims priority to International Application No. PCT/JP2015/077871 filed on Sep. 30, 2015, the contents of which are incorporated herein in their entirety.

TECHNICAL FIELD

The present invention relates to a surroundings monitoring device of a crawler-type work machine.

BACKGROUND ART

A surroundings monitoring controller of a work machine has been typically known in order for an operator to revolve an upper revolving body while checking surrounding conditions of the upper revolving body using a monitor provided inside a cab, the monitor displaying an overview image generated from images taken by a plurality of cameras attached to a vehicle body of the work machine (see, for instance, Patent Literature 1).

Such a surroundings monitoring device also has been installed in various hydraulic excavators in recent years.

A hydraulic excavator occasionally includes an optional attachment (e.g., a blade) in addition to working equipment including a boom, arm, and bucket. The blade is attached to an undercarriage and the undercarriage travels with the blade kept in contact with the ground, thereby conducting earth filling and ground leveling (see, for instance, Patent Literature 2).

Moreover, there has been typically known a technique of displaying a guideline (e.g., a line expressing a trajectory drawn by a rear end of a counterweight when the upper revolving body is revolved) drawn based on a position of the rear end of the counterweight of the upper revolving body on an overview image and a single-camera image (i.e., an image taken by a single camera).

CITATION LIST

PATENT LITERATURE(S)

Patent Literature 1: JP-A-2013-253402
Patent Literature 2: JP-A-2008-2113

SUMMARY OF THE INVENTION

Problem(s) to be Solved by the Invention

A crawler-type work machine (e.g., a hydraulic excavator) can perform a so-called ultra pivot turn that is to revolve the entire hydraulic excavator including an undercarriage and an upper revolving body around a revolution center by rotating right and left crawlers respectively in reverse directions (e.g., by operating the right crawler forward and the left crawler backward).

The hydraulic excavator has a variety of types, among which a rear small-revolving type hydraulic excavator (corresponding to a later-described hydraulic excavator shown in FIG. 1) is designed to have a smaller rear side of the upper revolving body than that of a typical hydraulic excavator. In the typical hydraulic excavator, the farthest position from the revolution center is generally at a rear end of a counterweight. However, in the rear small-revolving type hydraulic excavator, the farthest position from the revolution center is at an outer end of each of the crawlers.

Accordingly, even when the guide line drawn based on the rear end of the counterweight is displayed on the overview image, single-camera image and the like in the rear small-revolving type hydraulic excavator in the same manner as in a typical art, when the rear small-revolving type hydraulic excavator is subjected to the ultra pivot turn, the outer end of each of the crawlers at the farthest position from the revolution center is likely to be positioned outside the guideline (e.g., the trajectory drawn by the rear end of the counterweight). Accordingly, even when an operator recognizes an obstacle existing near the hydraulic excavator and a positional relationship between the obstacle and the guideline (e.g., the trajectory drawn by the rear end of the counterweight) through the overview image and the like, when the operator conducts the ultra pivot turn, the outer end of each of the crawlers is positioned outside the guideline to cause the operator to erroneously recognize a distance between the outer end and the obstacle, so that the outer end is likely to collide with the obstacle and the like.

An object of the invention is to provide a surroundings monitoring device of a crawler-type work machine, the surroundings monitoring controller enabling an operator to easily recognize a distance between an obstacle and the farthest position from a revolution center of a work machine to reduce a possibility that the work machine collides the obstacle and the like.

Means for Solving the Problem(s)

According to an aspect of the invention a surroundings monitoring device of a crawler-type work machine including a crawler-type undercarriage and an upper revolving body includes: a camera configured to take an image of surroundings of the crawler-type work machine; a display unit configured to display the image taken by the camera; and a controller configured to superimpose an outer-edge guide image generated based on the farthest position of the undercarriage from a revolution center of the crawler-type work machine on the image taken by the camera and displayed on the display unit.

According to the above aspect of the invention, since the controller superimposes the outer-edge guide image generated based on the farthest position of the undercarriage from the revolution center of the crawler-type work machine on the image taken by the camera, when an operator recognizes an obstacle existing around the work machine by the image taken by the camera, the operator can easily understand a positional relationship and a distance between the outer-edge guide image and the obstacle. Accordingly, even when the crawler-type work machine is subjected to the ultra pivot turn, collision between the crawler-type work machine and the obstacle can be avoided.

With the above arrangement, the controller is configured to change the outer-edge guide image by receiving a signal by a switch operation or a detector, the signal indicating that a distance from the revolution center to the farthest position of the undercarriage is changed.

In this arrangement, the signal indicating that the distance from the revolution center to the farthest position of the undercarriage is changed is exemplified by a signal indicating that a switch and the like provided in the cab of the work machine are operated and a signal indicating that an optional attachment is attached to the work machine and transmitted from a working equipment controller when the optional attachment (e.g., a blade) is attached to the work machine.

With the above arrangement, since only a specific person (e.g., a mechanical inspector) is allowed to change the outer-edge guide image and an ordinary operator is not allowed to change the outer-edge guide image, the outer-edge guide image can be prevented from being erroneously displayed by an erroneous operation. Moreover, even if the mechanical inspector forgets operating the switch, the detector detects that the blade is attached, so that the outer-edge guide image is automatically changed.

With the above arrangement, the image taken by the camera is an overview image or a single-camera image.

With the above arrangement, since the outer-edge guide image can be superimposed on the overview image or the single-camera image to be displayed on the display unit, when the operator visually checks the images, the operator can perform operations while visually checking an outer edge of the crawler-type work machine and can easily understand the positional relationship and the distance between the outer-edge guide image and the obstacle.

With the above arrangement, the outer-edge guide image is shaped in a combination of a straight line and an arc.

With the above arrangement, since the outer-edge guide image includes the straight line, for instance, at a loading operation onto a dump truck, the operator can check whether or not the dump truck is parked obliquely to a predetermined parking direction by comparing the straight line of the outer-edge guide image with a lateral side and a rear side of the dump truck. Moreover, since the operator can recognize a length in a width direction and a length in a travel direction of the crawler-type work machine, the operator can further reliably understand the distance from the obstacle.

With the above arrangement, the outer-edge guide image is shaped in a circle around the revolution center.

With the above arrangement, when the operator recognizes the obstacle through the overview image and the like, the operator can further reliably understand the distance from a revolution trajectory of the farthest position of the undercarriage from the revolution center at the ultra pivot turn.

With the above arrangement, the display unit is provided to a remote control seat in the crawler-type work machine, a display device provided in a control room for controlling the crawler-type work machine, or a mobile terminal.

With the above arrangement, since the images (overview image and single-camera image) taken by the camera and on which the outer-edge guide image is superimposed can be displayed in a remote control seat, a control room or a mobile terminal, a remote-control operator and a third person (e.g., a supervisor) other than the operator of the crawler-type work machine can easily check the overview image and the like. Accordingly, the remote-control operator and the third person can understand the distance from the obstacle to further reliably avoid collision with the obstacle.

BRIEF DESCRIPTION OF DRAWING(S)

DESCRIPTION OF EMBODIMENT(S)

First Exemplary Embodiment (1) Overall Arrangement

Figure 1:
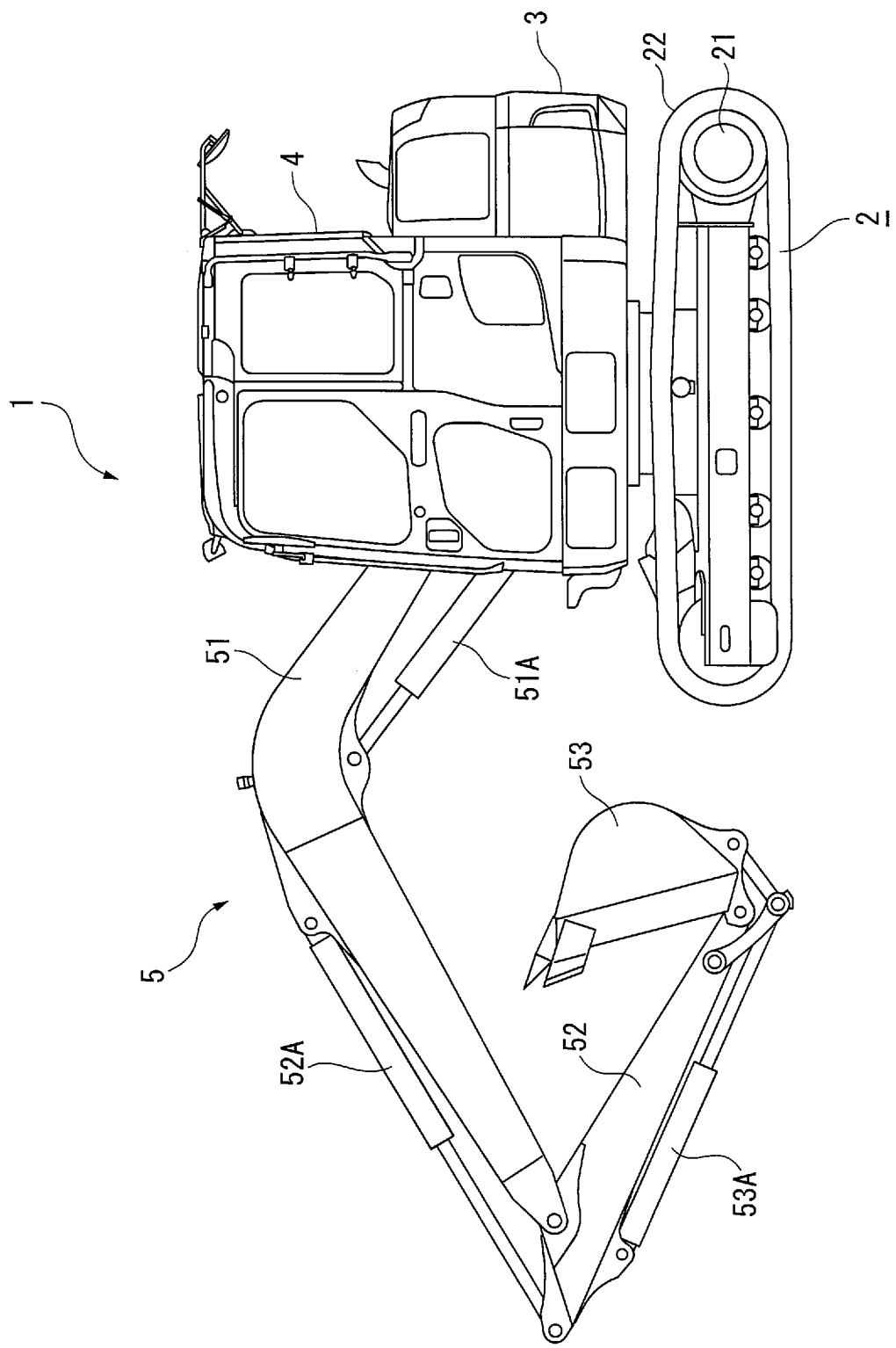
FIG. 1 is a lateral side view showing a crawler-type work machine according to a first exemplary embodiment of the invention.
Figure 2:
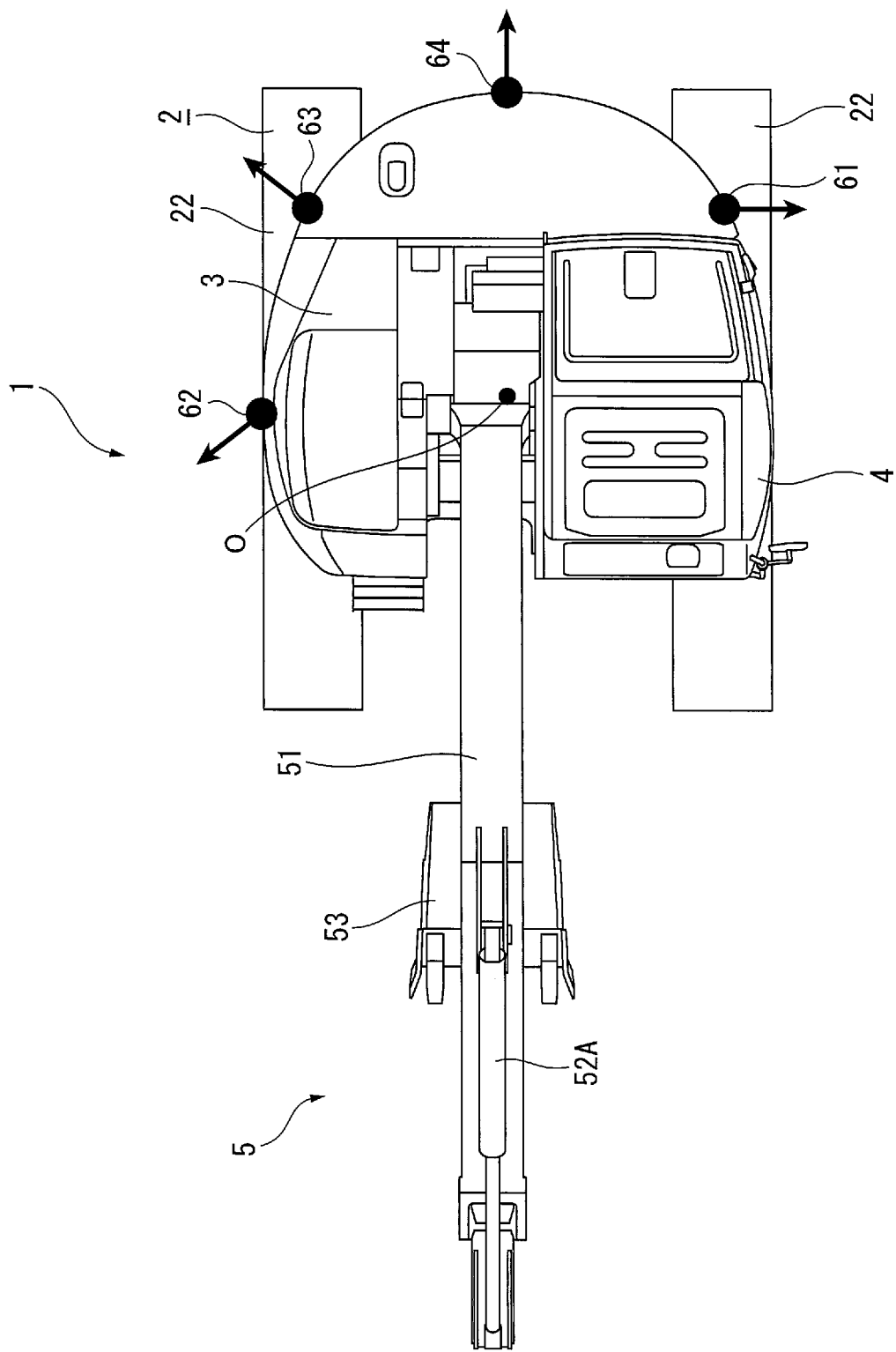
FIG. 2 is a plan view showing the crawler-type work machine in the above exemplary embodiment.

As shown in FIGS. 1 and 2, a hydraulic excavator 1 in a form of a crawler-type work machine includes an undercarriage 2, an upper revolving body 3, a cab (operation room) 4, and working equipment 5. The undercarriage 2 is provided in a form of a crawler-type undercarriage and includes: a truck frame (not shown) beneath the upper revolving body 3; and a pair of traveling devices 21 respectively provided on both ends of the truck frame in a vehicle width direction orthogonal to a travel direction. Each of the traveling devices 21 includes crawlers 22 each wound around a drive wheel and an idler wheel projecting from the truck frame. When the drive wheels (first and second drive wheels) are driven, the hydraulic excavator 1 is moved forward and backward in an extension direction of the crawlers 22.

The right and left traveling devices 21 can independently drive the respective drive wheels (to move the hydraulic excavator 1 forward and backward). When the right crawler and the left crawler are simultaneously moved forward, the hydraulic excavator 1 is moved forward. When the right crawler and the left crawler are simultaneously moved backward, the hydraulic excavator 1 is moved backward. When the first drive wheel of the traveling devices 21 is driven in a direction reverse to a direction in which the second wheel of the traveling devices 21 is driven, for instance, when the right crawler is moved forward and the left crawler is moved backward at the same time, the hydraulic excavator 1 can be revolved around the revolution center by the undercarriage 2. Such a revolving method is called an ultra pivot turn.

As shown in FIG. 2, for instance, the upper revolving body 3 includes four cameras 61 to 64. As described later, images taken by the cameras 61 to 64 are displayed on a monitor 65 (a display unit), whereby an operator recognizes surroundings around the hydraulic excavator 1. It should be noted that the "images taken by the cameras" include an image taken by one of the cameras (i.e., single-camera image) and a top view image (i.e., an overview image) generated based on the images taken by the cameras (described later).

The upper revolving body 3 is revolvably provided on the truck frame of the undercarriage 2. It should be noted that a revolution center O at the ultra pivot turn of the undercarriage 2 may coincide with a revolution center O of the upper revolving body 3 as shown in FIG. 2, but both of the revolution centers O may be different from each other. The "revolution center" recited in the scope of claim refers to either the revolution center O at the ultra pivot turn or the revolution center O of the upper revolving body 3.

The upper revolving body 3 includes the cab 4 in which the operator sits and operates the hydraulic excavator 1. In the cab 4, an operator's seat (not shown) is provided and working equipment levers (not shown) are provided on both sides of the operator. A travel lever for travel operation is provided on a floor of the cab 4.

Further, a monitor 65 (not shown in FIG. 2) is provided in the cab 4 and can display various information including conditions such as an engine water temperature and a residual fuel amount, failure information expressing that a device is in an abnormal condition and the like, a menu screen, a maintenance screen and the like for the operator to input various settings, and the images taken by the cameras 61 to 64 of a later-described surroundings monitoring device 60 (see FIG. 3).

When a direction in which the working equipment 5 of the upper revolving body 3 faces is defined as a front direction, the working equipment 5 is provided on a right side of the cab 4. The working equipment 5 includes a boom 51, an arm 52 and a bucket 53. The boom 51, the arm 52 and the bucket 53 are respectively rotated by a boom cylinder 51A, an arm cylinder 52A and a bucket cylinder 53A. The cylinders 51A, 52A and 53A are hydraulic cylinders. A hydraulic source for the cylinders is a hydraulic pump drivable by an engine (not shown) provided to the upper revolving body 3.

(2) Arrangement of Surroundings Monitoring Device 60

Figure 3:
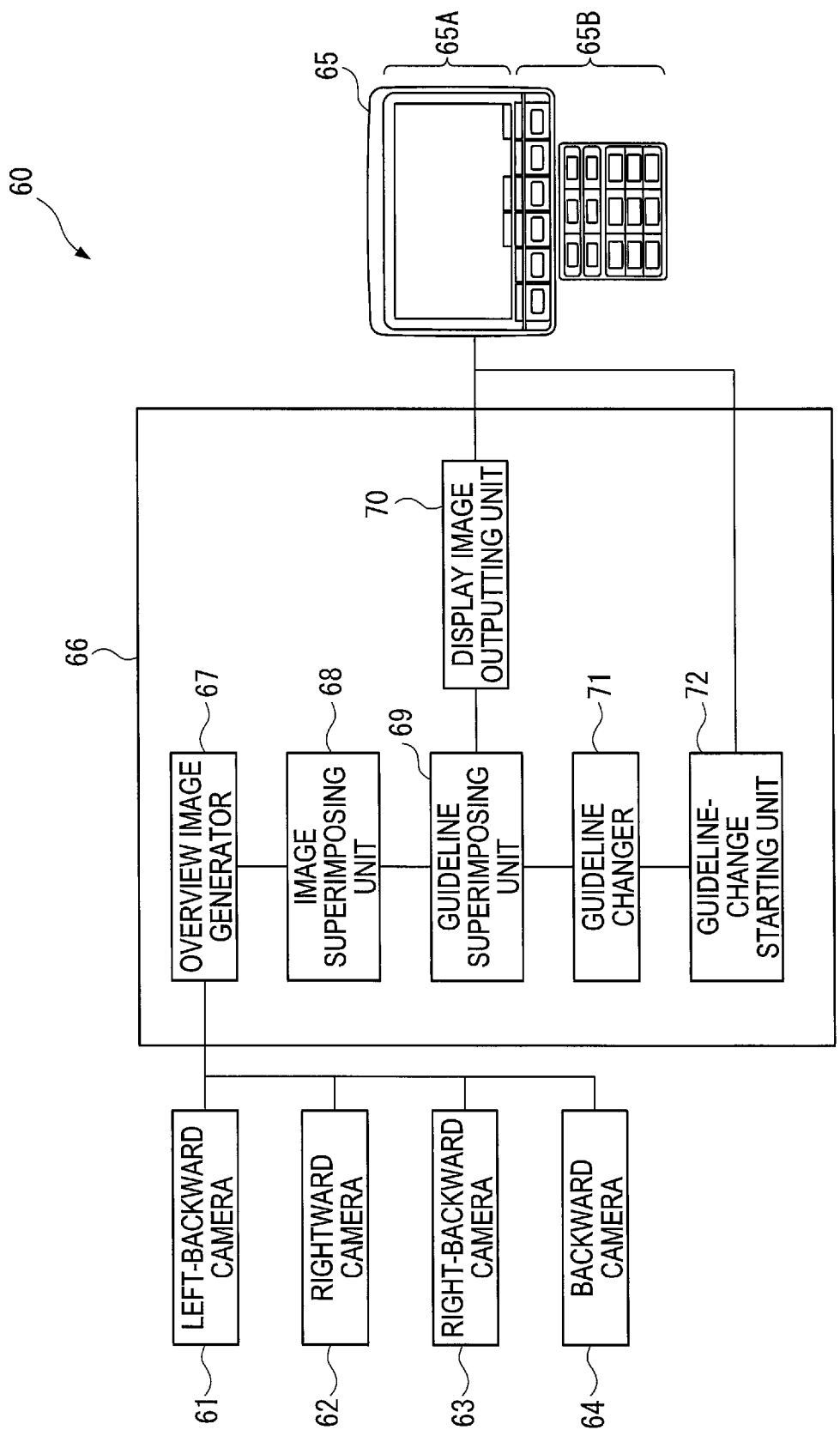
FIG. 3 is a block diagram showing a configuration of a surroundings monitoring device in the above exemplary embodiment.

FIG. 3 shows the surroundings monitoring device 60 according to the exemplary embodiment. The surroundings monitoring device 60 takes images of surroundings of the above hydraulic excavator 1 using the cameras 61 to 64 and displays the images on the monitor 65 provided in the cab 4. The surroundings monitoring device 60 includes the left-backward camera 61, the rightward camera 62, the right-backward camera 63, the backward camera 64, the monitor 65 (display unit), and a surroundings monitoring controller 66 (controller).

The left-backward camera 61 is provided to a left rear side of the upper revolving body 3 as shown in FIG. 2 so that the left-backward 61 faces in an arrow direction shown in FIG. 2 and takes a leftward image of the hydraulic excavator 1. The rightward camera 62 is provided to a right side of the upper revolving body 3 as shown in FIG. 2 so that the rightward camera 62 faces in an arrow direction shown in FIG. 2 and takes a right-forward image of the hydraulic excavator 1. The right-backward camera 63 is provided to a right rear side of the upper revolving body 3 as shown in FIG. 2 so that the right-rear camera 63 faces in an arrow direction shown in FIG. 2 and takes a right-backward image of the hydraulic excavator 1. The backward camera 64 is provided substantially at a rear center of the upper revolving body 3 as shown in FIG. 2 so that the backward camera 64 faces in an arrow direction shown in FIG. 2 and takes a backward image of the hydraulic excavator 1. A wide-angle lens is attached to each of the cameras 61 to 64. The respective image ranges of adjacent ones of the cameras (except for the left-backward camera 61 and the rightward camera 62) partially overlap with each other.

The monitor 65 includes a display 65A and an operation unit (switch) 65B. The above-described various information including the engine water temperature, the residual fuel amount and the like are displayed on the display 65A. By operating the operation unit 65B, a monitor controller (not shown) is controlled to change the contents displayed on the display 65A. The operation unit 65B includes: a switch usable for operations on the menu screen and the maintenance screen; and a switch usable for inputting various settings on a work mode, a travel mode, an air conditioner and the like. The monitor 65 may be provided by a touch panel integrally including the display 65A and the operation unit 65B. Alternatively, the operation unit 65B and the display 65A are provided by separate bodies. The operation unit 65B may be provided in a different location within the cab.

The monitor 65 also functions as a display unit that displays the images taken by the cameras 61 to 64. When the operation unit 65B of the monitor 65 is operated to input an operational command to the surroundings monitoring controller 66, the monitor 65 is configured to switch the camera image displayed on the display 65A, for instance, from the camera image taken by the backward camera 64 to the camera image taken by the rightward camera 62.

Figure 4:
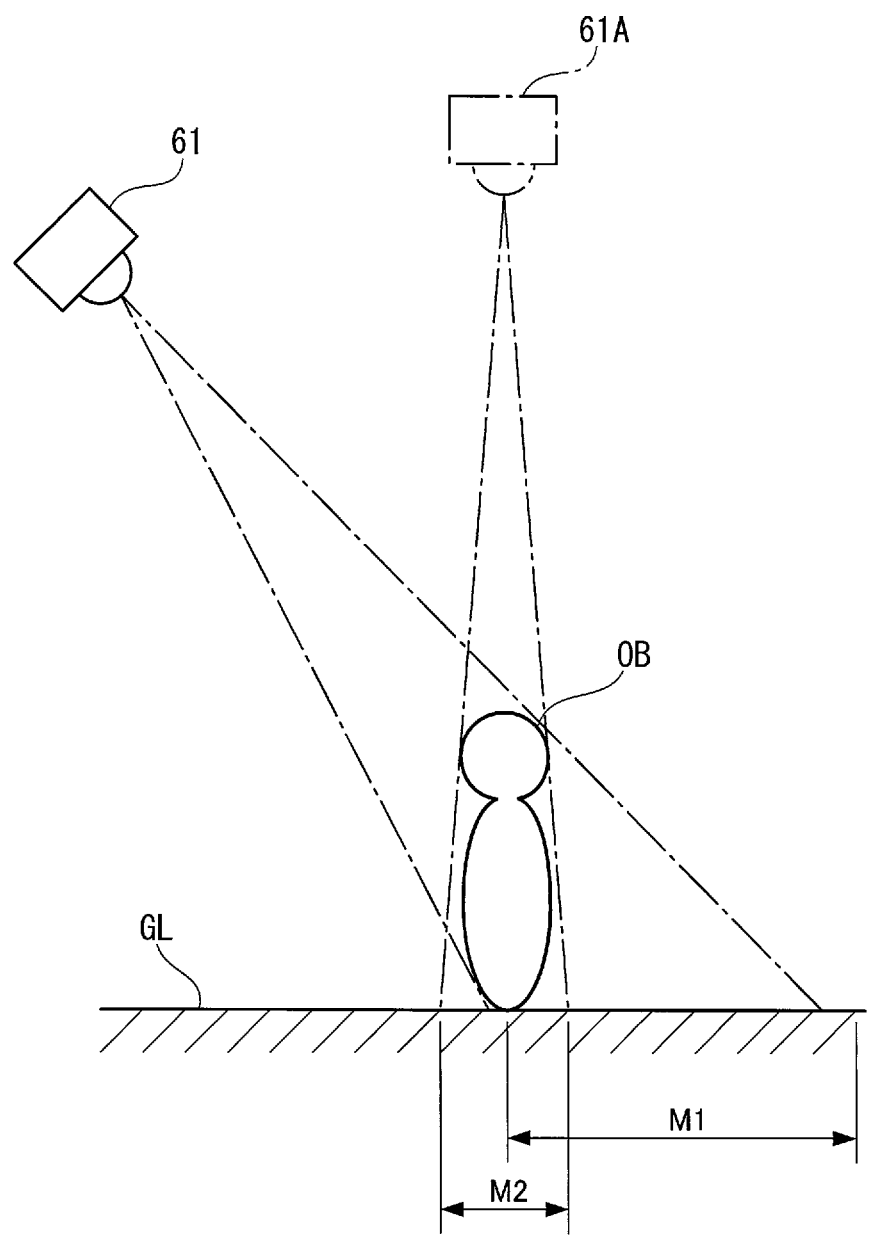
FIG. 4 is a schematic illustration showing generation of an overview image.

As shown in FIG. 3, the surroundings monitoring controller 66 includes an overview image generator 67, an image superimposing unit 68, a guideline superimposing unit 69, a display image outputting unit 70, a guideline changer 71, and a guideline-change starting unit 72. Based on the images taken by the cameras 61 to 64, the overview image generator 67 in FIG. 3 generates an overview image (see G2 in FIG. 9) displaying the surroundings of the hydraulic excavator 1 as seen from the above. Specifically, the overview image generator 67 converts coordinates of image data using conversion information stored in a memory (not shown) of the surroundings monitoring controller 66 (not shown). As shown in FIG. 4, for instance, the overview image generator 67 converts the image taken by the camera 61 to an image (i.e., the top view image) projected on a predetermined imaginary projection surface GL from an imaginary view point 61A positioned above the hydraulic excavator 1.

The conversion information is in terms of the imaginary projection surface GL. For instance, a dimension M1 of a target OB whose image is taken from obliquely above by the camera 61 is converted to a dimension M2 on the imaginary projection surface GL. After converting the image data taken by the four cameras 61 to 64 to the respective top view images, the overview image generator 67 synthesizes the converted image data to generate a single overview image to allow the operator to see surroundings of the hydraulic excavator 1 from above.

Figure 9:
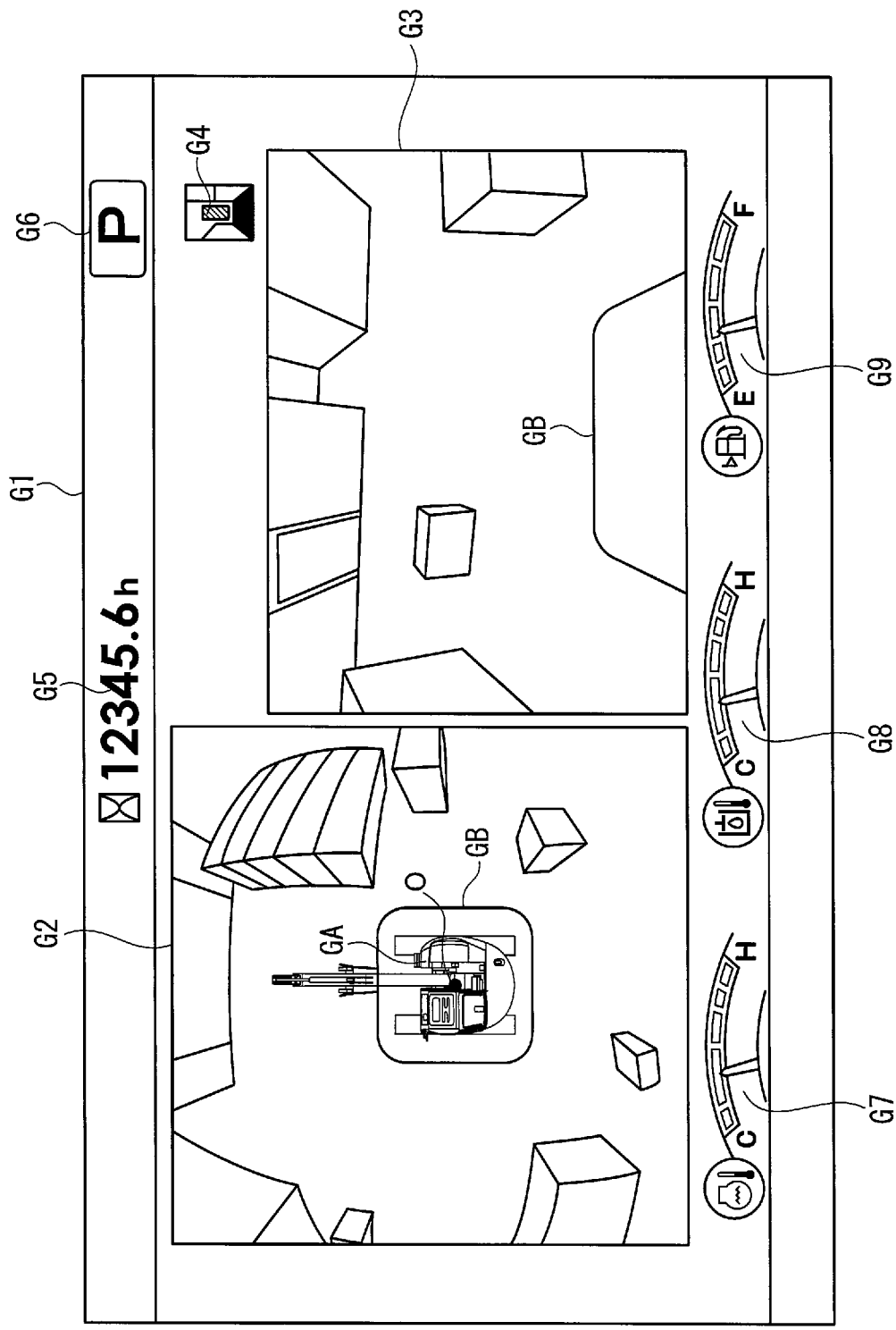
FIG. 9 is a display example of a monitor display on which an overview image and a single-camera image are displayed in the first exemplary embodiment.

As shown in the overview image G2 in FIG. 9, a top face image GA (of only the upper revolving body 3) of the hydraulic excavator 1 is stored in the memory. The image superimposing unit 68 in FIG. 3 superimposes the top face image GA of the hydraulic excavator 1 at the center of the overview image G2 generated by the overview image generator 67. With this operation, by looking at the overview image G2 shown in FIG. 9, the operator easily recognizes a positional relationship and a distance between a surrounding obstacle and the like and the hydraulic excavator 1 which are displayed in the overview image G2.

The guideline superimposing unit 69 superimposes a guideline GB generated by the guideline changer 71 (described later) on the overview image G2 and the single-camera image G3 (see FIG. 9).

Figure 5:
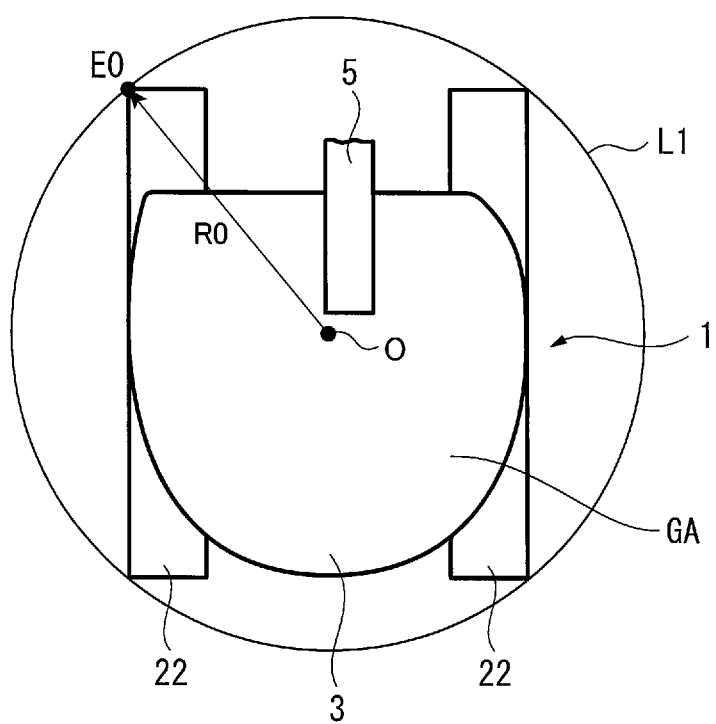
FIG. 5 is a schematic illustration showing a drawing method of a guide line in the first exemplary embodiment.

The guideline changer 71 generates a guideline according to a drawing method described below. FIG. 5 is a simplified plan view showing the hydraulic excavator 1, in which an illustration of a front end of the working equipment 5 is omitted. The farthest position from the revolution center O in the undercarriage 2 is at an outer end E0 of each of the crawlers 22. A distance from the revolution center O to the outer end E0 of each of the crawlers 22 is defined as R0. In FIG. 5, a circle L1 with a radius R0 is drawn around the revolution center O.

Figure 6:
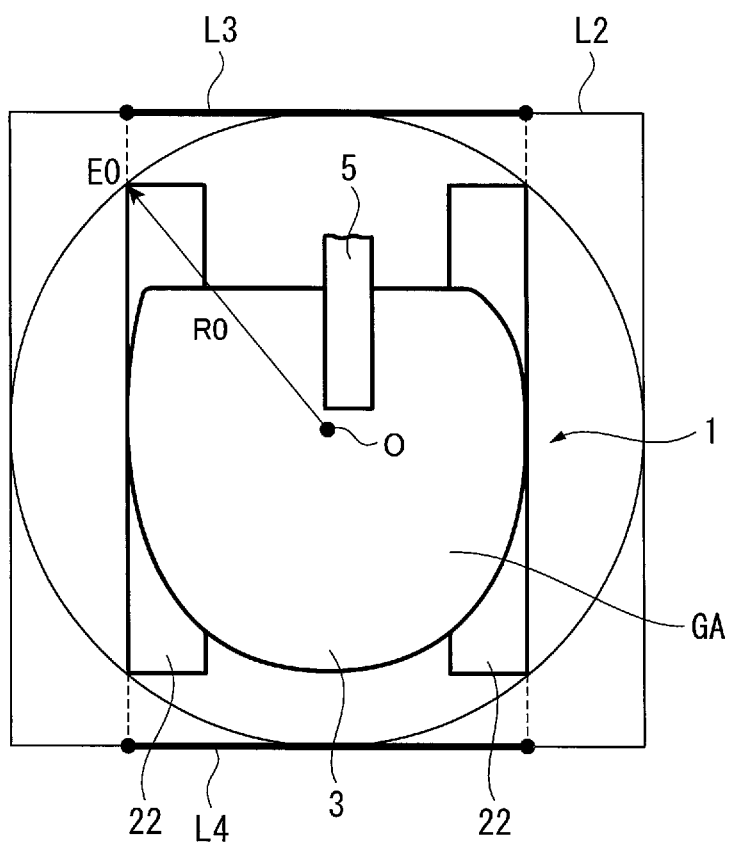
FIG. 6 is another schematic illustration showing the drawing method of the guide line in the first exemplary embodiment.

In FIG. 6, a square L2 is circumscribed to the circle L1 drawn in FIG. 5. This drawing includes a straight line L3 and a straight line L4 obtained by projecting a width of the upper revolving body 3, which is positioned to squarely face a side of the square, onto the square L2. Alternatively, a distance between laterally adjacent ones of outer edges of the crawlers 22 may be employed in place of the width of the upper revolving body in order to draw the straight lines L3 and L4.

Figure 7:
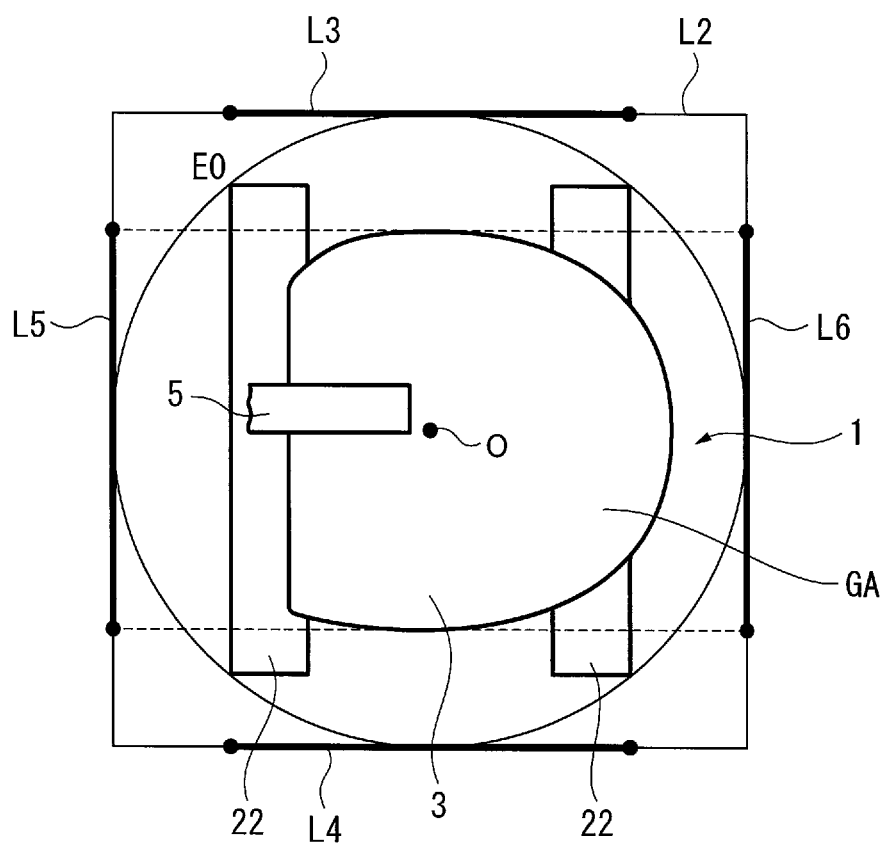
FIG. 7 is still another schematic illustration showing the drawing method of the guide line in the first exemplary embodiment.

In FIG. 7, the upper revolving body 3 is revolved by 90 degrees from the position of the upper revolving body 3 shown in FIG. 6 and straight lines L5 and L6 are drawn according to the same method as shown in FIG. 6.

Figure 8:
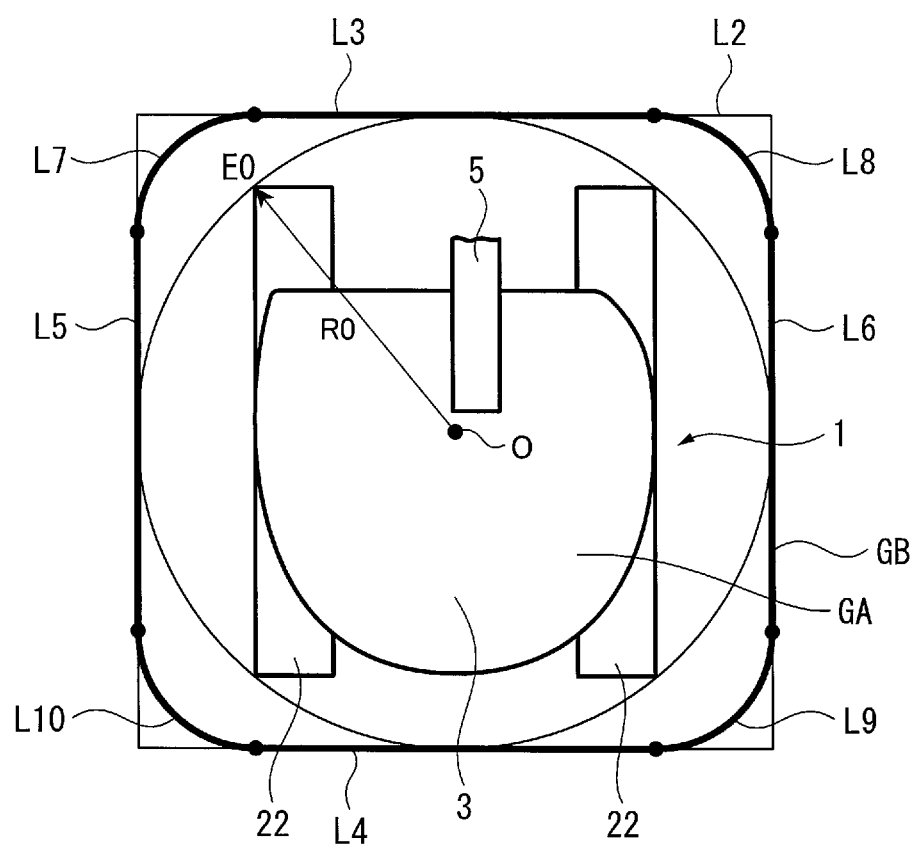
FIG. 8 is a further schematic illustration showing the drawing method of the guide line in the first exemplary embodiment.

In FIG. 8, the guideline changer 71 draws arcs L7 to L10 between adjacent ones of the straight lines L3 to L6. The straight lines L3 to L6 and the arcs L7 to L10 are connected to form a single line, which is defined as the guideline GB. When the guideline GB is superimposed on the overview image G2, the drawing as shown in FIG. 8 is displayed on the monitor 65.

Since the top face image GA and the guideline GB of the upper revolving body 3 are superimposed on the overview image G2, when the upper revolving body 3 is revolved, the overview image G2 displays the surroundings image and the undercarriage 2 whose image is unintentionally taken by the cameras 61 to 64 in a rotating manner while the upper revolving body 3 and the guideline GB are kept fixed (described later). Moreover, when the ultra pivot turn is conducted (when the upper revolving body and the undercarriage 2 are simultaneously revolved), the overview image G2 displays that only the surroundings image is rotating while the upper revolving body 3, the guideline GB and the undercarriage 2 whose image is unintentionally taken by the cameras 61 to 64 are kept fixed.

In the positional relationship between the upper revolving body 3 and the undercarriage 2 as shown in FIG. 8 (when the upper revolving body 3 and the undercarriage 2 squarely face each other), the outer ends E0 of the crawlers 22 from the revolution center O is apart from the guideline. Although not shown in the drawing, when the upper revolving body 3 is revolved by 45 degrees from a state shown in FIG. 8 (when the upper revolving body 3 and the undercarriage 2 are inclined by 45 degrees in the overview), the four (left-top, right-top, right-bottom and left-bottom) outer ends of the crawlers 22 are brought into contact with the centers of the four straight lines (L3 to L6) of the guideline. In this state, the distance between the outer ends of the crawlers 22 and the guideline is the shortest. However, the outer ends of the crawlers 22 never cross the guideline.

The display image outputting unit 70 in FIG. 3 displays the overview image G2, on which the top face image GA of the hydraulic excavator 1 and the guideline (which is an example of the outer-edge guide image) GB are superimposed, on the display 65A of the monitor 65 as the display image G1 as shown in FIG. 9. As shown in the overview image G2, the guideline superimposing unit 69 superimposes the guideline GB generated by the guideline changer 71, in which the guideline GB is displayed at positions corresponding to the farthest position of the undercarriage 2 from the revolution center O of the hydraulic excavator 1 (at the outer ends E0 of the crawlers 22 in the exemplary embodiment), on the overview image generated by the overview image generator 67.

In the exemplary embodiment, the display image outputting unit 70 also displays the single-camera image G3 taken by any one of the cameras 61 to 64 on the display image G1. As shown in the single-camera image G3, the guideline GB may be superimposed on the single-camera image.

Moreover, the display image outputting unit 70 also displays a single-camera image positional icon G4. The single-camera image positional icon G4 is an icon for showing which one of the backward, right-backward, right-forward and leftward images taken by the cameras 61 to 64 for the hydraulic excavator 1 is displayed as the single-camera image G3 displayed on the display unit of the monitor 65. For instance, when the single-camera image positional icon G4 is disposed near the single-camera image G3 on the display unit in FIG. 9, the operator can easily judge which one of the single-camera images is displayed on the display unit as the single-camera image G3.

A service meter image G5 and a work mode image G6 are displayed on an upper part of the display image G1 shown in FIG. 9. The service meter image G5 displays a total working hours of the engine of the hydraulic excavator 1. The work mode image G6 displays in which work mode the hydraulic excavator 1 is operated among a power mode (P), eco-mode (E) and the like. Further, an engine water temperature G7, a hydraulic fluid temperature G8, and a residual fuel amount G9 are displayed on a lower part of the display image G1.

As shown in FIG. 9, the guideline GB generated based on the farthest position from the revolution center in the undercarriage 2 is superimposed on the overview image G2 or the single-camera image G3. With this operation, even when a hydraulic excavator such as a rear small-revolving type hydraulic excavator designed to have a small upper revolving body conducts the ultra pivot turn, the outer ends and the like of the crawlers 22 do not cross the guideline GB. Accordingly, when the operator recognizes existence of an obstacle near the hydraulic excavator by the overview image and the like, the operator can perform operations without collision of the outer ends and the like of the crawlers 22 with the obstacle and the like.

Second Exemplary Embodiment

In a second exemplary embodiment, a hydraulic excavator 1A including a blade for ground leveling, the blade being attached to a front side of the undercarriage, will be described below.

Figure 10:
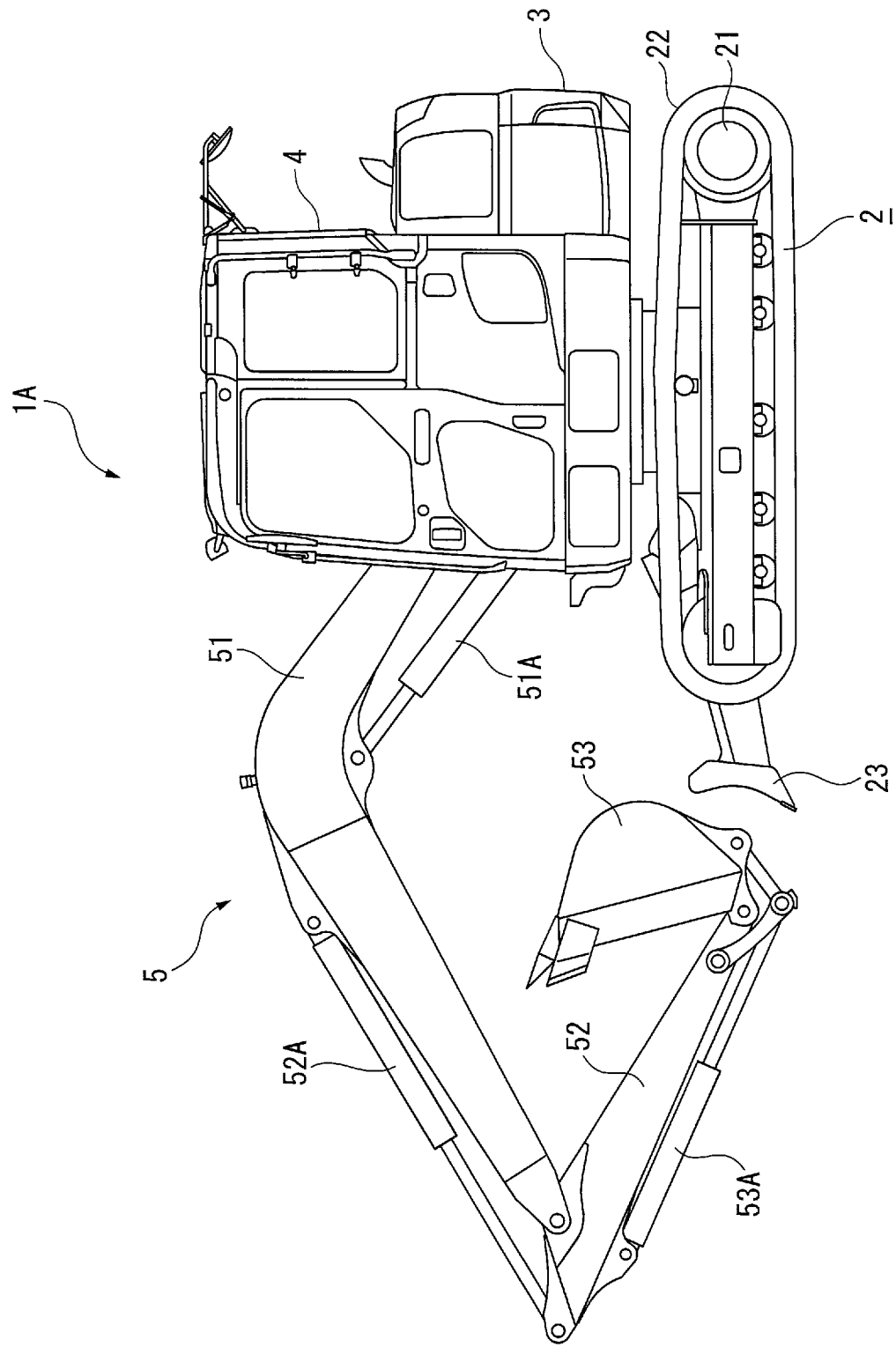
FIG. 10 is a lateral side view showing a crawler-type work machine according to a second exemplary embodiment of the invention.
Figure 11:
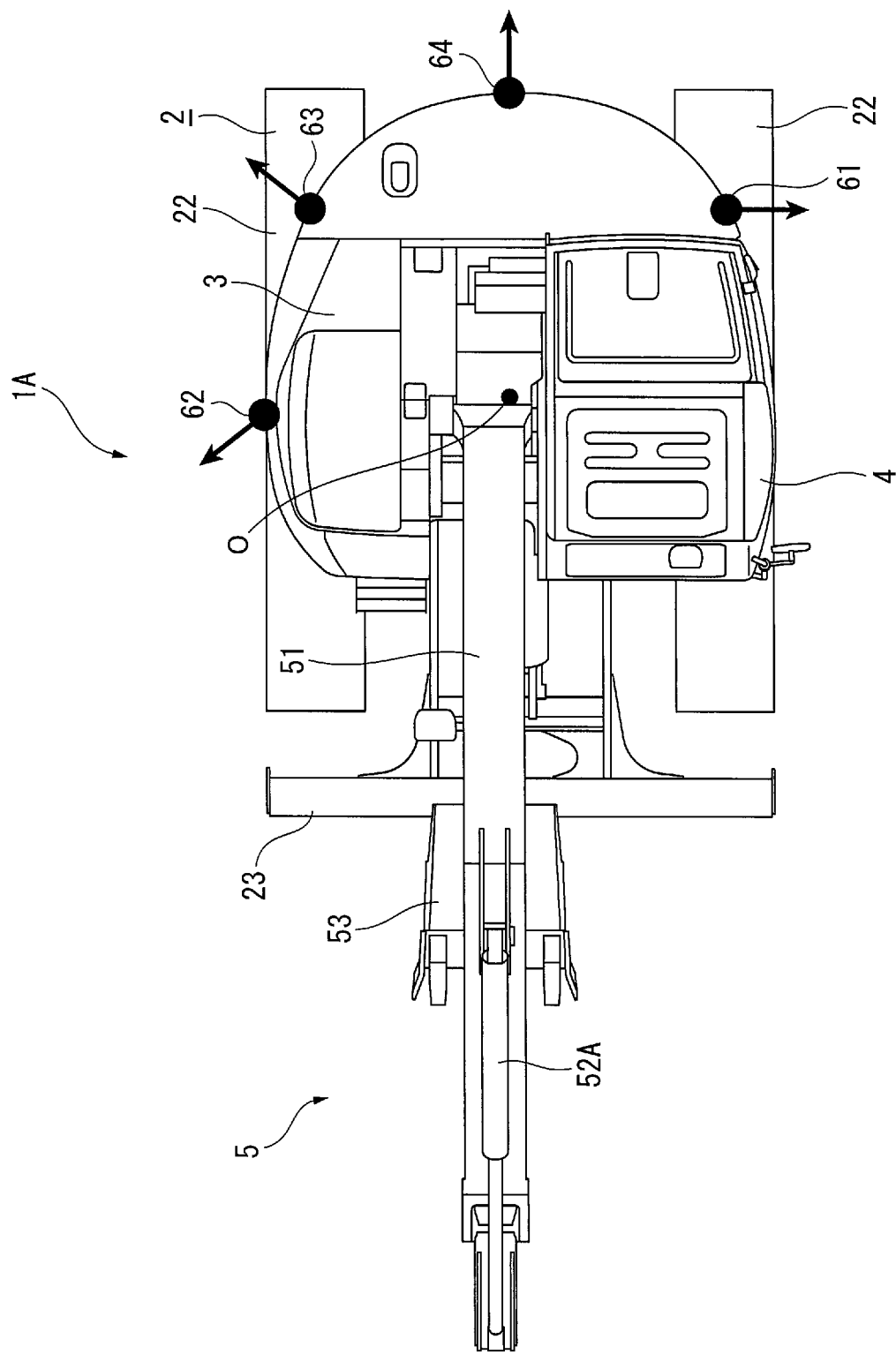
FIG. 11 is a plan view showing the crawler-type work machine in the second exemplary embodiment.

The hydraulic excavator 1A shown in FIGS. 10 and 11 is the same as the hydraulic excavator 1 shown in FIGS. 1 and 2 except for the blade 23 attached to the front side of the undercarriage 2. Accordingly, the description of the components other than the blade 23 will be omitted. The blade 23 may be detachable. The blade 23 includes a plurality of hydraulic cylinders (not shown) and is movable vertically and horizontally using the hydraulic cylinders. It should be noted that the blade 23 is regarded as a part of the undercarriage 2 since the blade 23 is attached to the undercarriage 2.

Figure 12:
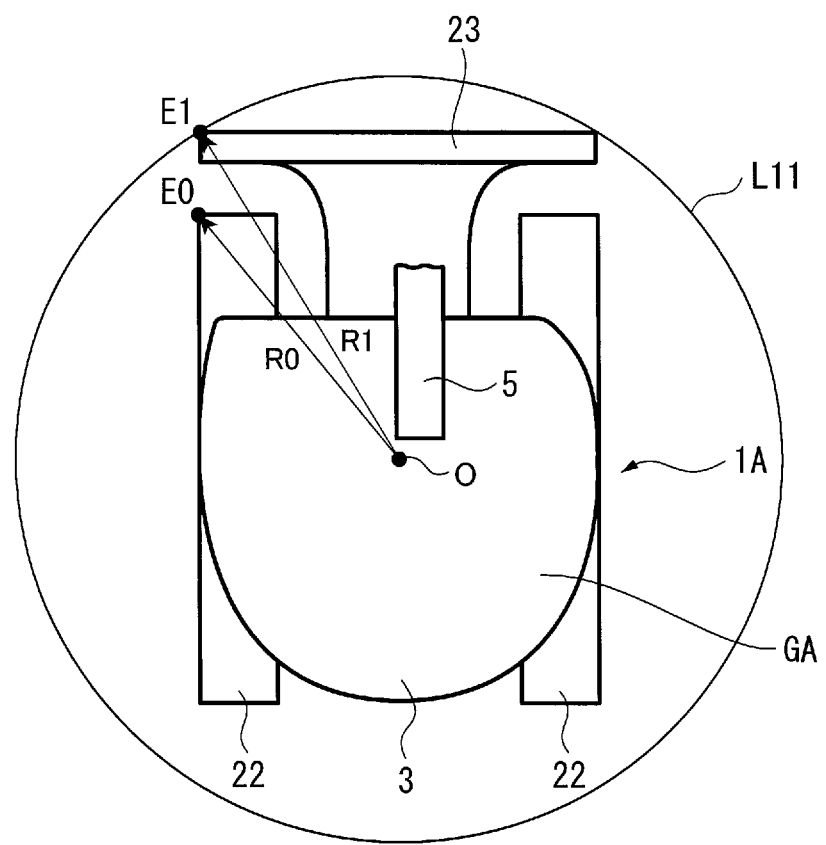
FIG. 12 is a schematic illustration showing a drawing method of a guide line in the second exemplary embodiment.

In the second exemplary embodiment, a drawing method of the guideline by the guideline changer 71 will be described. FIG. 12 is a simplified plan view showing the hydraulic excavator 1A provided with the blade, in which illustration of a front end of the working equipment is omitted.

In the first exemplary embodiment as shown in FIG. 5, the farthest position from the revolution center O in the undercarriage 2 is at the outer end E0 of each of the crawlers 22. However, in the second exemplary embodiment in which the blade 23 is attached, the farthest position from the revolution center O in the undercarriage 2 is at a blade front end E1. A distance from the revolution center O to the blade front end E1 is defined as R1 longer than a distance R0 from the revolution center O to the outer end E0 of each of the crawlers 22. In FIG. 12, a circle L11 with the radius R1 is drawn around the revolution center O.

Figure 13:
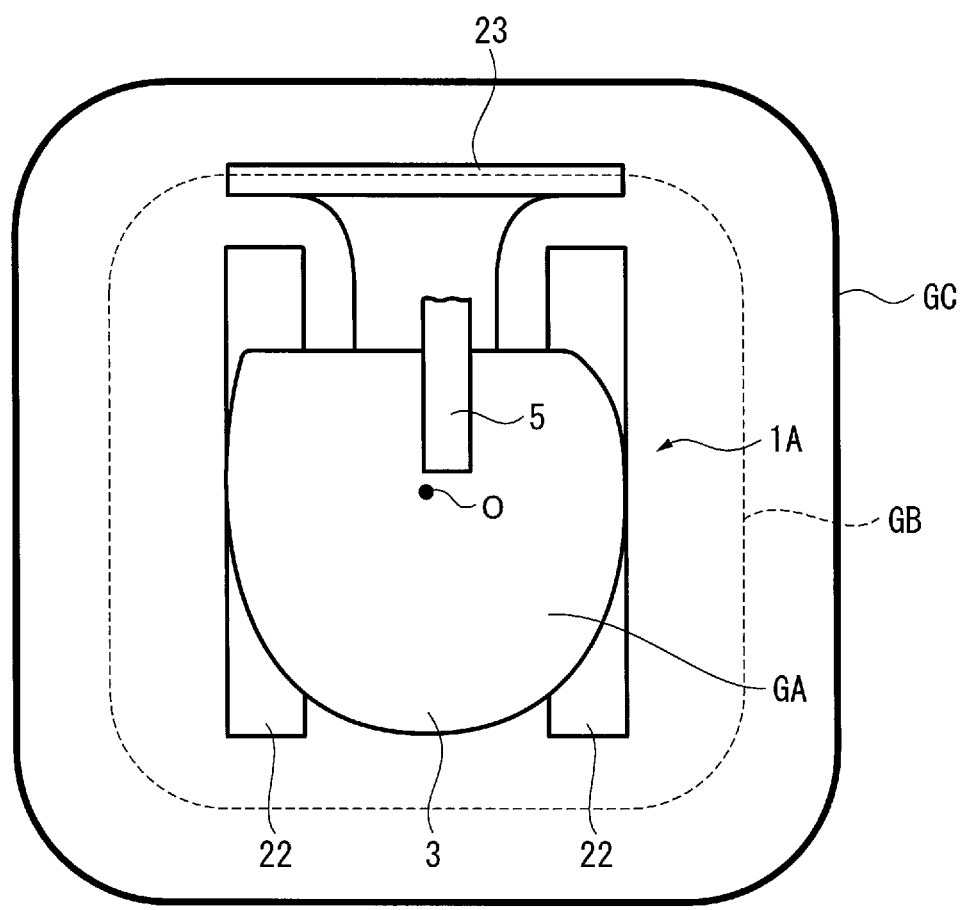
FIG. 13 is another schematic illustration showing the drawing method of the guide line in the second exemplary embodiment.

A drawing method of the guideline based on the circle L11 with the radius R1 around the revolution center O is exactly the same as the method described in FIGS. 6 to 8, description of which is omitted. FIG. 13 shows a guideline GC of the hydraulic excavator 1A provided with the blade, the guideline GC being drawn by the above method. In comparison with the guideline GB of a typical hydraulic excavator without the blade, it is understood that the guideline GC of the hydraulic excavator 1A with the blade is larger than the guideline GB. This is because R1 is longer than R0 in terms of the distance from the revolution center O to the farthest position of the undercarriage 2.

In the same manner as in the first exemplary embodiment, the guideline changer 71 generates the guideline GC to be displayed at the position corresponding to the farthest position of the undercarriage 2 from the revolution center O of the hydraulic excavator 1A (the front end E1 of the blade 23 in the exemplary embodiment). Subsequently, the guideline changer 71 superimposes the guideline GC on the overview image or the single-camera image generated by the overview image generator 67.

Figure 14:
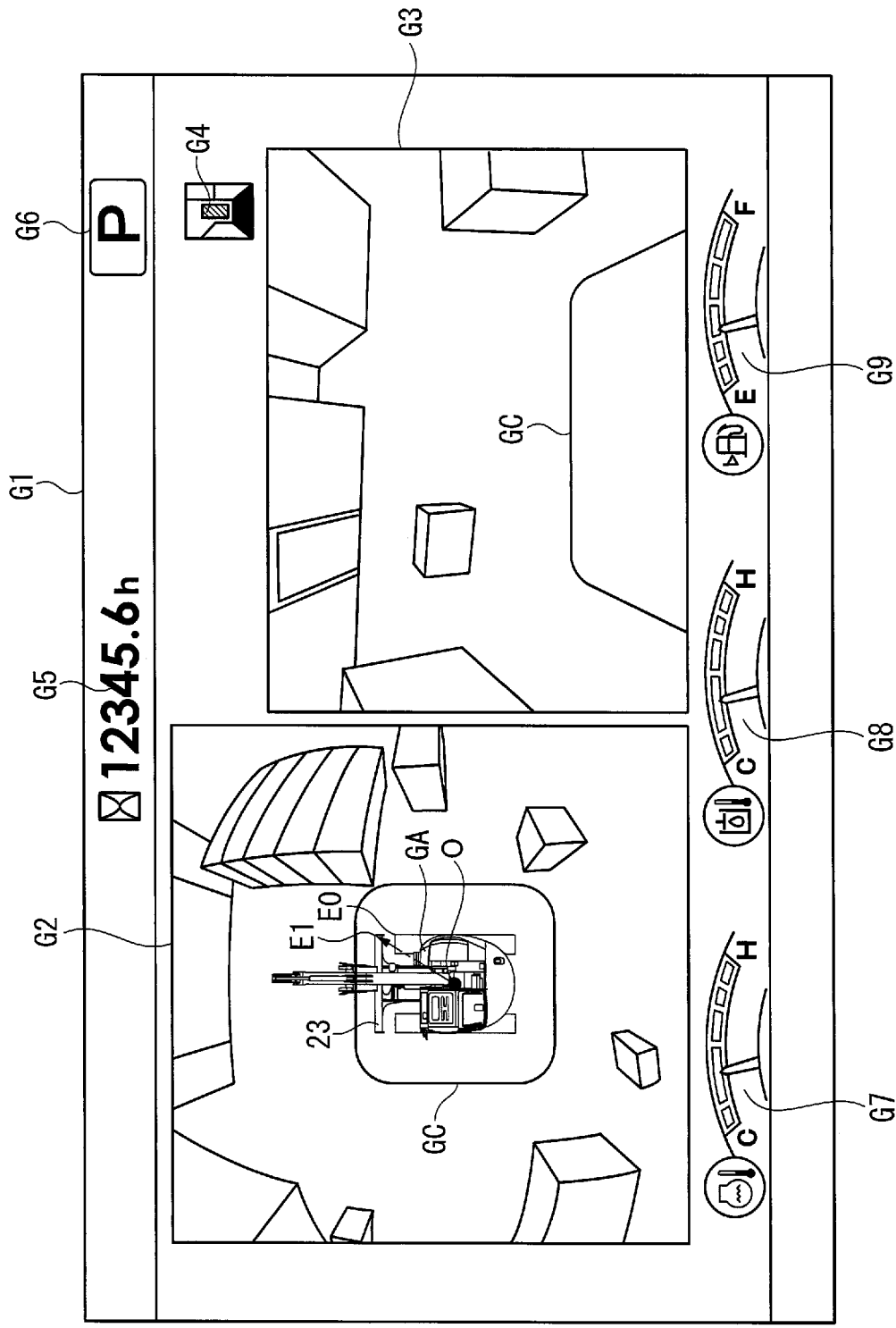
FIG. 14 is a display example of a monitor display on which an overview image and a single-camera image are displayed in the second exemplary embodiment.

FIG. 14 shows an example of a display screen of the monitor in the second exemplary embodiment, in which the guideline GC is superimposed on each of the overview image G2 and the single-camera image G3.

The guideline changer 71 in FIG. 3 may change the guideline, which is to be superimposed by the guideline superimposing unit 69, depending on the farthest position of the undercarriage 2 in the hydraulic excavator 1. For instance, the guidelines according to the hydraulic excavator 1 in a variety of types (e.g., the typical hydraulic excavator 1 without the blade in the first exemplary embodiment and the hydraulic excavator 1A with the blade in the second exemplary embodiment) may be stored in the memory. Subsequently, when the hydraulic excavator 1A with the blade is selected, the guideline changer 71 may superimpose the guideline GC according to a size of the blade 23 on the overview image as shown in the overview image G2 in FIG. 14.

As shown in FIG. 3, the guideline-change starting unit 72 is connected to the monitor 65. Specifically, when an inspector and the like for the hydraulic excavator 1 input model information indicating one of the typical hydraulic excavator 1 without the blade, the hydraulic excavator 1A with the blade, and the like with use of the operation unit of the monitor 65, such a signal indicating the above model information is inputted to the guideline-change starting unit 72. The guideline-change starting unit 72 outputs the inputted model information to the guideline changer 71. The guideline changer 71 outputs the guideline having a size appropriately changed depending on the model (e.g., the rear small-revolving type hydraulic excavator or the hydraulic excavator with the blade) to the guideline superimposing unit 69. With this operation, the guideline superimposing unit 69 can superimpose an appropriately sized guideline on the overview image or the single-camera image.

It should be noted that the overview image G2 displays the image of the blade 23 as shown in FIG. 14 when the predetermined blade 23 is attached. This is because the image of the blade 23 is unintentionally taken by the camera 61 and the like.

Moreover, the guideline GB may also be superimposed on the single-camera image G3 as shown in FIGS. 9 and 14.

(3) Operations and Effects in First and Second Exemplary Embodiments

Figure 15:
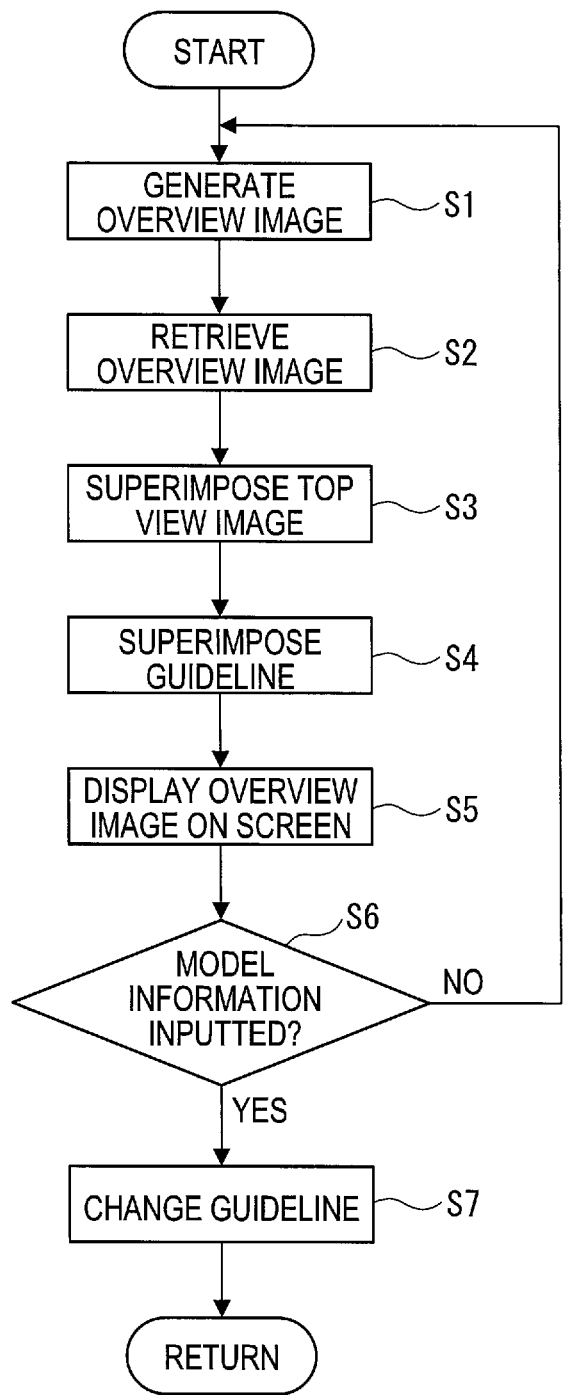
FIG. 15 is a flowchart showing operations in the above exemplary embodiments.

Next, operations in the first and second exemplary embodiments will be described with reference to the flowchart shown in FIG. 15.

Firstly, the overview image generator 67 generates the overview image G2 based on the images of the cameras 61 to 64 (Step 51). The image superimposing unit 68 retrieves the overview image G2 generated by the overview image generator 67 (Step S2) and superimposes the top face image GA of the hydraulic excavator 1 on the overview image G2 (Step S3). The guideline superimposing unit 69 superimposes the guidelines GB and GC inputted from the guideline changer 71 on the overview image G2 (Step S4). The display image outputting unit 70 displays on the monitor 65 the top face image GA and the overview image G2 on which the guidelines GB and GC are superimposed (Step S5).

While the overview image G2 is kept displayed, the guideline-change starting unit 72 monitors whether or not the inspector or the like operates the monitor 65 to input the model information (Step S6). When the model information is inputted, the guideline-change starting unit 72 outputs a signal to instruct the guideline changer 71 to change the size of the guideline according to the inputted model, thereby changing the size of the guideline (Step S7).

According to the above first and second exemplary embodiments, the following effects are obtained.

Since the guideline changer 71 is provided, when the inspector or the like inputs the model information, the guidelines GB and GC are generated based on the farthest position of the undercarriage 2 from the revolution center O in the hydraulic excavators 1 and 1A depending on the model and are superimposed on the overview image and the like. Accordingly, since the operator can judge the distance from the obstacle based on the positions of the guidelines GB and GC displayed on the monitor 65, the operator can perform operations without collision with the obstacle and the like. Specifically, when the obstacle exists outside the guidelines GB and GC, the crawlers 22, the blade 23 and the like do not collide with the obstacle even when the ultra pivot turn is performed.

Moreover, since the guideline-change starting unit 72 is provided, only a specific person (e.g., a mechanical inspector) is allowed to change the guideline. An ordinary operator may not be allowed to change the guideline. This arrangement prevents the operator from erroneously operating to display a guideline smaller than the guideline corresponding to the farthest position of the undercarriage 2 from the revolution center O of the hydraulic excavators 1 and 1A.

(4) Modification(s) of Exemplary Embodiment(s)

The invention is not limited to the above exemplary embodiments, but encompasses modifications described below.

In the above exemplary embodiments, the guideline-change starting unit 72 monitors the information inputted using the monitor 65 and starts the guideline changer 71. However, the invention is not limited thereto. The guideline changer 71 may be started based on whether or not a predetermined operation switch provided in the cab 4 is operated, or by detecting that the blade 23 is attached according to a detection signal of various sensors (detectors). With this arrangement, even if the inspector forgets inputting the information using the monitor 65, the detectors detect that the blade is attached, so that the guideline changer 71 is automatically started.

In the above exemplary embodiments, the guidelines (examples of the outer-edge guide images) GB and GC are provided by a combination of the straight line and the arc. However, the shape of the guideline is not limited thereto but may be a circle around the revolution center at the ultra pivot turn or a circle around the revolution center of the upper revolving body, the circle being circumscribed to the outer ends of the crawlers 22 and the blade front ends or being provided by a circle slightly larger than the circle circumscribed to the outer ends of the crawlers 22 and the like. Further, the shape of the guideline is not limited to the circle. Alternatively, the outer-edge guide image may be provided by points, any marks and the like in a row. The outer-edge guide image is not necessarily arranged in a straight line. Further, only a single outer-edge guide image is displayed in the above exemplary embodiments, but a plurality of outer-edge guide images having different sizes may be simultaneously displayed.

In the above exemplary embodiments, the size and the display position of each of the guidelines GB and GC are determined based on the distance from the revolution center O of the hydraulic excavator 1, but are not limited thereto. The size and the display position of the guideline may be determined based on a distance from a predetermined position on the hydraulic excavator 1 when the hydraulic excavator 1 is seen from the above viewpoint.

In addition to the above exemplary embodiments, when a hydraulic excavator including the crawlers 22 having a long length and/or a large width is selected as the model information, in which the farthest position of the undercarriage from the revolution center O is changed, the guideline is also changed.

Further, in the above exemplary embodiments, the guidelines GB and GC are generated based on the farthest position of the undercarriage 2 from the revolution center O, but not limited thereto.

For instance, when the farthest position from the revolution center O in the hydraulic excavator (except for the working equipment) is not on the undercarriage but at any position on the upper revolving body (except for the working equipment), the guideline may be generated based on the any position on the upper revolving body (except for the working equipment), for instance, based on the position of the rear end (counterweight) of the upper revolving body. At this time, the size of the guideline may be changed according to the model selected as the model information, specifically, based on whether the model of a typical type is selected or the model of a type with a heavier counterweight and a longer rear end than those of the typical type (in other words, the farthest position from the revolution center O in the hydraulic excavator is further apart from that in the typical hydraulic excavator) is selected.

Further, when the information indicating that the posterior counterweight is attached is inputted as the model information, since the rear end of the upper revolving body is extended by the posterior counterweight, the size of the guideline may be changed.

Moreover, in the above exemplary embodiments, the overview image is generated by the four cameras attached to the upper revolving body. However, the number of the cameras is not limited as long as two or more cameras are provided.

In the above exemplary embodiments, the overview image and the single-camera image are simultaneously displayed on a standard screen, but the invention is not limited thereto. Only one of the overview image and the single-camera image may be displayed. Alternatively, the overview image and the single-camera image may be alternately displayed by switching the screen without being displayed on the standard screen.

Moreover, in the above exemplary embodiments, the monitor 65 is disposed in the cab 4 of the work machine. However, the monitor 65 may be disposed in other places such as a remote control seat for conducting a remote control of the work machine or a control room for controlling and managing an entirety of a plurality of work machines in a construction site. Further, the monitor 65 may be provided by a mobile terminal so that the operator can check the overview image and the single-camera image displayed on the mobile terminal. In this arrangement, when the overview image is displayed on the monitor 65 in the remote control seat and the control room and when the mobile terminal is used as the monitor 65, any communication unit may be provided to each of the work machine, the remote control seat, the control room and the mobile terminal, through which information such as the overview image is transmitted and received.

In addition, other configuration(s) may be employed as long as an object of the invention is compatible with it.

The invention claimed is:

1. A surroundings monitoring device of a crawler-type work machine comprising a crawler-type undercarriage and an upper revolving body, the surroundings monitoring device comprising:
   a camera configured to take an image of surroundings of the crawler-type work machine;
   a display unit configured to display an overview image generated from the image taken by the camera; and
   a controller configured to superimpose, on the overview image displayed on the display unit, an outer-edge guide image generated so as to be circumscribed to a circle around a revolution center of the crawler-type work machine in the overview image, the circle having a radius that is a distance from the revolution center to a farthest portion of the undercarriage in the overview image,
   wherein the outer-edge guide image includes a plurality of straight lines that touch portions of the circle and an arc that connects the plurality of straight lines to each other,
   wherein the controller is configured to determine a square that circumscribes the circle,
   wherein each of the plurality of straight lines is a portion of a face of the square, and has a length corresponding to a width of the upper revolving body in the overview image projected to the face of the square, and wherein the plurality of straight lines comprises:
a first straight line that is a portion of a first face of the square, the first straight line having a first length corresponding to a first width of the upper revolving body projected to the first face of the square in a state in which the upper revolving body is in a first orientation with respect to the undercarriage in the overview image, and
a second straight line that is a portion of a second face of the square, the second straight line having a second length corresponding to a second width of the upper revolving body projected to the second face of the square in a state in which the upper revolving body is in a second orientation with respect to the undercarriage in the overview image.

2. The surroundings monitoring device according to claim 1, wherein
the controller is configured to change the outer-edge guide image by receiving a signal by a switch operation or a detector, the signal indicating that the distance from the revolution center to the farthest position of the undercarriage is changed.

3. The surroundings monitoring device according to claim 1, wherein
the image taken by the camera is converted to the overview image, or is a single-camera image.

4. The surroundings monitoring device according to claim 1, wherein
the display unit is provided to a remote control seat in the crawler-type work machine, a display device provided in a control room for controlling the crawler-type work machine, or a mobile terminal.

5. The surroundings monitoring device according to claim 1, further comprising:
a guideline changer configured to change a size of the outer-edge guide image based on presence or absence of a blade in the crawler-type work machine; and
a guideline superimposing unit configured to superimpose the outer-edge guide image changed by the guideline changer on the overview image.

6. The surroundings monitoring device according to claim 1, wherein the controller is configured to enable a user to recognize a distance between an obstacle and the farthest position from the revolution center by superimposing the outer-edge guide image at a position in the display unit corresponding to the farthest position of the undercarriage.

7. The surroundings monitoring device according to claim 1, wherein the controller is configured to superimpose the outer-edge guide image at a position in the display unit corresponding to the farthest position of the undercarriage that is within a range of an arm of the crawler-type work machine.

8. The surroundings monitoring device according to claim 1, wherein the farthest position of the undercarriage is disposed at an outer end of the undercarriage in the overview image.

9. The surroundings monitoring device according to claim 1, wherein the circle touches an outer end of the undercarriage in the overview image.

10. The surroundings monitoring device according to claim 1, wherein the arc connects an end of the first straight line to an end of the second straight line, and is disposed between the circle and the square.

11. The surroundings monitoring device according to claim 1, wherein the second orientation is rotated 90 degrees from the first orientation.

12. The surroundings monitoring device according to claim 1, wherein the outer-edge guide image is a single line displayed on the display unit, and the circle is not displayed on the display unit.

13. The surroundings monitoring device according to claim 1, wherein the overview image is generated by converting the image taken by the camera to an image that is projected to an imaginary projection surface from a view point above the crawler- type work machine.

* * * * *